United States Patent [19]

Nakajima et al.

[11] Patent Number: 5,306,213
[45] Date of Patent: Apr. 26, 1994

[54] TOOTHED BELT

[75] Inventors: Masayoshi Nakajima; Kazutoshi Ishida, both of Kobe; Satoshi Murakami, Kakogawa, all of Japan

[73] Assignee: Mitsuboshi Belting Ltd., Nagata, Japan

[21] Appl. No.: 886,339

[22] Filed: May 20, 1992

[30] Foreign Application Priority Data

May 17, 1991 [JP] Japan ................. 3-142374

[51] Int. Cl.$^5$ ............................................. F16G 1/28
[52] U.S. Cl. ............................... 474/205; 474/271; 474/263
[58] Field of Search ............... 474/143, 205, 263, 266, 474/268, 271

[56] References Cited

U.S. PATENT DOCUMENTS

| | | |
|---|---|---|
| 4,583,963 | 4/1986 | Marsh et al. ................. 474/205 |
| 4,740,192 | 4/1988 | Mashimo et al. ............. 474/263 |
| 4,773,895 | 9/1988 | Takami et al. ............. 474/263 X |
| 4,832,673 | 5/1989 | Nagai et al. .............. 474/263 |
| 5,120,280 | 6/1992 | Mizuno et al. ........... 474/263 X |
| 5,178,586 | 1/1993 | Mizuno et al. ............. 474/266 |

*Primary Examiner*—Ramon S. Britts
*Assistant Examiner*—Roger J. Schoeppel
*Attorney, Agent, or Firm*—Wood, Phillips, VanSanten, Hoffman & Ertel

[57] ABSTRACT

A power transmission belt having a belt body with an inside surface and an outside surface, with the belt body having a compression section and a tension section, spaced outside of the compression section. At least a first part of the tension section is defined by a chlorosulfonated polyethylene rubber composition having a chlorine content of 15 to 30% by weight. At least a second part of the compression section is defined by a rubber composition that is different than the rubber composition of the first part.

36 Claims, 1 Drawing Sheet

TOOTHED BELT

BACKGROUND OF THE INVENTION

1. Field of the Invention

This invention relates to power transmission belts and, more particularly, to a belt having parts of the tension and compression sections thereof made from different rubber compositions to exhibit both a) resistance to wear in high and low temperature environments and b) resistance to oil penetration.

2. Background Art

In recent years, there has been an increasing demand for the toothed power transmission belt. The toothed power transmission belt has several advantages. First of all, it affords positive interaction with associated pulleys. The teeth provide slip-free driving, which cannot be accomplished with the conventional flat edge belt and V-belt. Toothed belts are also desirable in that they require no lubrication as is necessary with drives utilizing gears and/or chains.

The toothed belt has been particularly desirable in the automobile industry. It is commonly used in power transmission for overhead cam shafts (OHC) in automobiles. In the interest of conservation, the automobile industry has been designing smaller and more energy efficient automobiles. Designers strive to minimize the size of engines as well as engine compartments. These engines often operate at high speeds which results in substantial heat generation in the compartment therefor. Accordingly, belts for automobile engines must be constructed to withstand the high operating temperatures as well as the cold conditions that may be encountered at start-up.

It is conventional to construct such toothed belts primarily from chloroprene rubber. Chloroprene rubber, however, has a tendency to crack in high temperature environments. This is particularly a problem at the hardened belt tooth root. To overcome this problem, efforts have been made to improve the heat resistance of chloroprene rubber. While some improvement has been made, chloroprene rubber has certain inherent limitations at high temperatures. Consequently, satisfactory results with power transmissions have not been realized to date with chloroprene rubber.

As a result, there has been an increased effort to change from chloroprene rubber to rubbers with better heat resistance, and more particularly rubbers whose main chain has been highly or completely saturated. Exemplary of such rubbers are chlorosulfonated polyethylene rubber and hydrogenated nitrile rubber. Japanese Patent Laid Open Publication No. 1598227/1987 discloses a toothed belt utilizing hydrogenated nitrile rubber.

In using chlorosulfonated polyethylene rubber, designers of belts deal with two competing objectives; that of improving temperature resistance and oil resistance. Heat resistance, cold resistance and oil resistance are all affected by the chlorine content of the polymer. By controlling the chlorine content to improve the temperature resistance of the belt, the oil resistance is compromised, and vice versa.

Hydrogenated nitrile rubber also has some inherent drawbacks. First of all, it is very expensive. Secondly, it is a difficult composition to work with.

SUMMARY OF THE INVENTION

The present invention is specifically directed to overcoming the above-enumerated problems in a novel and simple manner.

The present invention comprehends a power transmission belt having a belt body with an inside surface and an outside surface, with the belt body having a compression section and a tension section, spaced outside of the compression section At least a first part of the tension section is defined by a chlorosulfonated polyethylene rubber composition having a chlorine content of 15 to 30% by weight. At least a second part of the compression section is defined by a rubber composition that is different than the rubber composition of the first part.

It is the principal objective of the present invention to provide a belt with excellent resistance both to temperature extremes and oil, which is commonly encountered in many environments in which belts, and particularly toothed belts, are employed.

The rubber composition described for the first belt part has a chlorine content chosen so that the rubber resists cracking and wear at extreme temperatures. However, this rubber does not effectively resist oil penetration and tends to swell if oil is absorbed thereby. Accordingly, the second part of the compression section is made from a rubber that has greater resistance to oil penetration.

More particularly, the rubber composition defining the second part is preferably at least one of a) a chlorosulfonated polyethylene rubber composition having a chlorine content of 32 to 45% by weight, b) a hydrogenated nitrile rubber composition, c) a nitrile rubber composition, and d) a chloroprene rubber composition.

It has been found that belts made with rubber compositions, as described above, exhibit excellent wear characteristics at extreme temperatures, and are effectively operable in environments wherein they are exposed to oil, as in an engine compartment.

The present invention has particular utility in power transmission belts with teeth spaced lengthwise thereof for positive drive These toothed belts are particularly prone to cracking at the belt roots.

In a preferred form, the volume of the rubber composition in the first part is not more than 4 times the volume of the rubber composition in the second part.

In one form, the rubber composition in the first part has a uniform thickness, with the thickness being at least 0.1 mm.

In one form, the rubber composition of the first part extends contiguously from the tension section into the compression section. Likewise, the rubber composition of the second part extends contiguously from the compression section into the tension section. The interface between the first and second parts has a wavy pattern generally following the contour of the belt teeth.

In one form, the chlorosulfonated polyethylene rubber composition in the second part has a chlorine content of 33 to 45% by weight. A more preferred range for the chlorine content is 34 to 43% by weight.

In one form, the chlorosulfonated polyethylene rubber composition in the first part has a chlorine content of 15 to 28% by weight and is more preferably in the range of 20 to 27% by weight.

In one form, the chlorosulfonated polyethylene rubber composition in the first part is one of a) chlorosulfonated low-density polyethylene having a linear molecular structure and b) a chlorosulfonated high-density polyethylene.

To improve the heat resistance of the belt, a magnesium oxide-aluminum oxide solid solution can be added to the chlorosulfonated polyethylene in at least one of the first and second parts. The magnesium oxide-aluminum oxide solid solution is provided preferably in 1 to 50 parts by weight per 100 parts by weight of chlorosulfonated polyethylene. More preferably, this range is 4 to 20 parts by weight per 100 parts by weight of chlorosulfonated polyethylene.

In a preferred form, there is a cover canvas layer on the teeth. The cover canvas is preferably one of a) plain weave fiber, b) twill fabric, c) satin fabric, and d) fabric that is stretchable lengthwise of the belt.

Preferably, the canvas layer is made from a fabric defined by warp and weft threads, and the threads are coated with one of a) a setting product that is one of i) an RFL solution, ii) an isocyanate solution, and iii) an epoxy solution, and b) rubber cement.

In a preferred form, there are load-carrying cords extending lengthwise of the belt between the tension and compression sections. In one form, at least one of the load-carrying cords is made up of a plurality of twisted strands, each of which is made up of a plurality of alkali-free glass filaments of 8 to 10$\mu$ in diameter, with a twist rate of 5 to 25 twists per 10 cm to define a first strand assembly. The strands in the first strand assembly are twisted in a first direction. A plurality of the first strand assemblies are twisted in a direction opposite to the first direction at a rate of 3 to 13 twists per 10 cm to define the one load-carrying cord.

In one form, the load-carrying cords are treated with an RFL solution. The RFL solution is preferably a mixture of resorcinol-formalin initial condensation product and latex.

Preferably, the load-carrying cords are also subjected to an overcoat treatment

The present invention also comprehends a power transmission belt having a belt body with an inside and outside surfaces, with the belt body having a compression section and a tension section spaced outside of the compression section. At least a first part of the tension section is defined by a first rubber composition. At least a second part of the compression section is defined by a rubber composition that is different than the first rubber composition The rubber composition in the second part is preferably at least one of a) a chlorosulfonated polyethylene rubber composition having a chlorine content of 32 to 45% by weight, b) a hydrogenated nitrile rubber composition, c) a nitrile rubber composition, and d) a chloroprene rubber composition

DETAILED DESCRIPTION OF THE DRAWINGS

Figure 1:
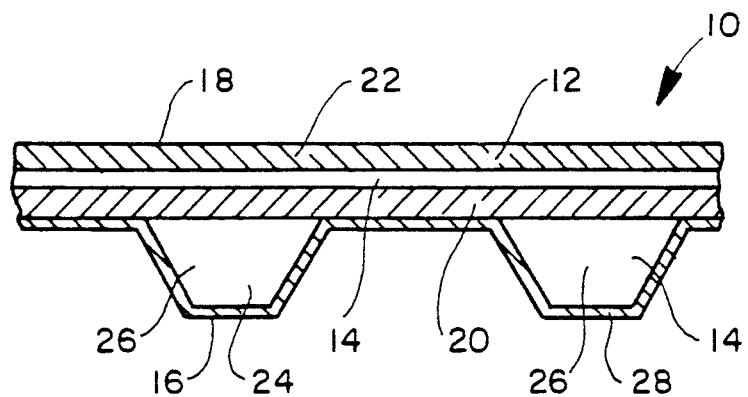
FIG. 1 is a sectional side elevation view of a toothed power transmission belt according to the present invention.

A power transmission belt, according to the present invention, is shown at 10 in FIG. 1. The belt 10 is defined by first and second rubber composition layers 12, 14, which define the belt back surface and belt tooth sides, respectively. The belt 10 has an inside surface 16, an outside surface 18, and a length extending from left to right in FIG. 1.

A plurality of laterally spaced, longitudinally extending cords 20 define the neutral axis for the belt 10. A tension section 22 is defined outside of the cords 20, with a compression section 24 defined inside of the cords 20.

The second rubber layer 14 defines longitudinally spaced teeth 26, which are covered by a canvas layer 28. The second layer 14 extends contiguously from the teeth 26 to outside of the load-carrying cords 20, so that the load-carrying cords 20 are fully embedded in the second rubber layer 14.

Figure 2:
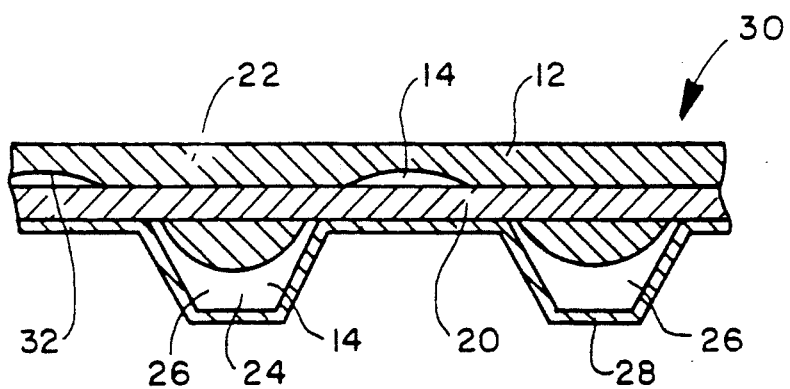
FIG. 2 is a sectional side elevation view of modified form of toothed power transmission belt according to the present invention.

In FIG. 2, a modified form of belt is shown at 30, according to the present invention. The belt 30 has substantially the same construction as the belt 10, to include a tension section 22 and compression section 24 on opposite sides of the load-carrying cords 20. The belt 30 has corresponding teeth 26 to which a canvas layer 28 is adhered.

The principal distinction resides in the interface 32 between the first and second layers 12, 14, respectively. The interface 32 has a wavy pattern, generally following the contour of the belt teeth 26. The first layer 12 defines only a part of the tension section and extends inside to penetrate the teeth 26 in the compression section 24. Similarly, the second layer 14 defines only a part of the teeth 26 in the compression section 24 and penetrates the tension section 22. The interface 32 between the layers 12, 14 thus moves alternatingly above and below the cords 20.

The invention contemplates the use of chlorosulfonated polyethylene rubber composition for the first-/back surface rubber layer 12. The rubber composition in the first layer 12 has a chlorine content of 15 to 30% by weight. Preferably, the chlorine content is 15 to 28% by weight, and more preferably in the range of 20 to 27% by weight.

The chlorine content of the chlorosulfonated polyethylene rubber composition determines the resistance thereof to extremes in temperature and oil. As the chlorine content decreases, the resistance to heat and cold increases, however, the resistance to oil penetration decreases. It has been found that chlorine content of under 15 % by weight is undesirable to produce a belt component in that the mechanical strength of the rubber composition is significantly diminished. On the other hand, if the chlorine content exceeds 30% by weight, while the resistance to oil improves, the rubber composition has inadequate heat resistance. The weight percentage range noted above has been found to be optimal in terms of mechanical strength, heat resistance, cold resistance and resistance to oil penetration.

The rubber composition in the first layer 12 is preferably a chlorosulfonated low-density polyethylene having a linear molecular structure or a chlorosulfonated high-density polyethylene having a chlorine content of 15 to 30% by weight, as previously described.

The invention contemplates that the second/tooth side rubber layer 14 be made from a rubber composition that is different than the rubber composition of the first layer 12. More particularly, the rubber composition for the second rubber layer is selected to provide a greater resistance to oil penetration. The oil-resistant rubber composition for the second layer is selected from the group consisting of a) chlorosulfonated polyethylene rubber compositions having a chlorine content of 32 to 45% by weight, b) hydrogenated nitrile rubber compositions, c) nitrile rubber compositions, and d) chloroprene rubber compositions. If the rubber composition for the second rubber layer is a chlorosulfonated polyethylene rubber composition, the preferred weight range is 33 to 45% and, more preferably, 34 to 43%. It is preferred to use a rubber composition for the second rubber layer 14 with a higher resistance to oil penetration than chlorosulfonated polyethylene rubber composition with chlorine content in the range of 15 to 30% by weight, as is preferred for the first layer. This is the case because the second rubber layer 14 of the belt will otherwise swell upon absorbing oil as when oil is spilled or otherwise splashed onto the belt, which may commonly occur in an automobile engine compartment. Once the belt swells, it becomes effectively widened and therefore makes poor engagement with a cooperating pulley. This can lead to rough operation and/or early destruction of the belt.

It has been found that excellent belt performance results with the volume of the rubber composition in the first rubber layer being not more than four times that of the rubber composition in the second rubber layer 14. More preferably, the rubber composition in the first rubber layer 12 is present in an amount equal to not more than two units by volume to one unit by volume of the rubber composition in the second rubber layer 14. It has been found that if this ratio exceeds four, the oil resistance will be insufficient because a significant amount of the rubber composition in the first rubber layer 12, with lesser oil resistance, will penetrate the teeth 26.

It has also been found that the thickness of the rubber composition in the first rubber layer 12 should be at least 0.1 mm. If the thickness is less than 0.1 mm, no significant resistance to temperature extremes will be realized. In the belt 10 shown in FIG. 1, the rubber layer 12 has a uniform thickness. However, in the belt 30 in FIG. 2, the same thickness varies considerably along the belt length.

To improve the heat resistance of chlorosulfonated polyethylene, the invention contemplates the addition of a magnesium oxide-aluminum oxide solid solution. The magnesium oxide-aluminum oxide solid solution, an acid recipient, is represented by the formula $Mg_{0.7}Al_{0.9}O_{1.15}$. This composition is commercially available from Kyowa Chemical Industry Co., Ltd., with this product identified as KW-2000 and KW-2100.

The amount of the acid recipient is normally 1 to 50 parts by weight and more preferably 4 to 20 parts by weight per 100 parts by weight of chlorosulfonated polyethylene. In the event that the magnesium oxide-aluminum oxide solid solution is less than one part by weight, the number of cross linking points for the chlorosulfonated polyethylene will decrease because the hydrogen chloride produced during cross linking cannot be effectively removed, which prevents the desired vulcanizing product from being realized. The result is that the toothed belt will be prone to cracking in a high temperature environment. If the amount of the acid recipient exceeds 50 parts by weight, the Mooney viscosity increases considerably to present a workability problem. The preferred range for the acid recipient, 1 to 50 parts by weight per 100 parts by weight of chlorosulfonated polyethylene, results in a belt with a long life and a rubber composition that is readily workable during manufacture.

The canvas layer 28 is one of a) a plain weave fabric, b) twill fabric, c) satin fabric, or d) another fabric that is stretchable in the direction of warp i.e. the longitudinal direction of the belt. In the case of plain weave canvas, the wave-formed crossings of warp and weft yarns are continuously formed in both the warp and weft directions because the warp and weft threads pass each time alternatingly over and under each other. When twill weave or satin weave canvas is used, the warp and weft threads form wave-formed crossings at longer intervals. That is, the warp and weft threads do not provide a wave-formed crossing at every point of overlap. Resultingly, the number of wave-formed crossings is reduced from that provided in ordinary plain weave canvas. The result of this is that the rubber penetrates not only the space between threads but also between threads at non-wave-formed crossing points This avoids direct contact of warp and weft threads during bending, which results in extended belt life.

To improve the stretchability of the canvas layer 28, the above-described plain weave canvas, twill weave canvas, or satin weave canvas can be interwoven with another low-orienting synthetic polyester fiber yarn.

The fabric forming warp and weft threads of the canvas layer 28 are coated with an adhesive layer that is either a) a setting product of an RFL solution, isocyanate solution, or epoxy solution, or b) rubber cement.

The load-carrying cords 20 are preferably a glass fiber or aramid fiber cord. The glass fiber cord is prepared, in one form, by twisting three strands, each made up of a bundle of a plurality of alkali-free glass filaments of 8 to 10$\mu$ in diameter. These filaments are twisted in a first direction at a rate of 5 to 25 twists per 10 cm to produce a strand assembly. 1 to 13 of such strand assemblies are twisted opposite to the first direction at a twisting rate of 3 to 13 twists per 10 cm to define the cords. An exemplary commercial product is identified as ECT150-3/6 through 3/13.

The aramid fiber cord is a bulk yarn made up of a bundle of 100 to 1000 filaments of 1 to 6 denier.

The cords are subjected to RFL treatment and an overcoat treatment. The RFL solution is a mixture of resorcinol-formalin initial condensation product and latex. It is preferred to keep the molar ratio of resorcinol and formalin at 1:0.5 to 3 for maximizing adhesive strength. The resorcinol-formalin initial condensation product is mixed in latex so that the resin content is 2 to 100 parts by weight per 100 parts by weight of the rubber content of the latex, and is then adjusted to a total solid content of 5 to 40% by weight.

The latex contemplated by the invention is at least one of styrene-butadiene-vinylpyridine terpolymer, chlorosulfonated polyethylene, H-NBR, epichlorohydrin, natural rubber, SBR, chloroprene rubber and olefin-vinyl ester copolymer.

The following examples were used to demonstrate the effectiveness of the present invention.

EXAMPLE 1

A bundle of three parallel yarns of ECG150, utilized as glass load-carrying cords, was immersed in an RFL treating solution that was 1% by weight of resorcinol, 1% by weight of 37% formalin, 18% by weight of vinylpyridine-SBR latex and 80% by weight of deionized water. The treated bundle was dried and baked, after which it was twisted at a rate of 16 twists per 10 centimeters to produce individual yarns. A bundle of 13 such yarns were twisted at a rate of 8 twists per 10 centimeters, immersed in rubber cement and heated to yield a glass fiber cord with a configuration of ECG150-3/13.

The cover canvas used was a twill fabric of 6, 6-nylon wooly processed yarn for the warp yarns and industrial 6, 6-nylon for the weft yarns and having a thickness of 0.25 mm in cross section The canvas was subjected to an adhesion treatment process to conform to the belt teeth. The first/back surface rubber layer 12 and the second-/tooth side rubber layer were prepared with a rubber composition utilizing chlorosulfonated polyethylene and hydrogenated nitrile rubber, as shown in Table 1.

TABLE 1

|  | CSM-1 | CSM-2 | H-NBR-1 |
| --- | --- | --- | --- |
| Chlorosulfonated polyethylene *1 | 100 | | |
| Chlorosulfonated polyethylene *2 | | 100 | |
| H-NBR *3 | | | 100 |
| MgO—Al$_2$O$_3$ solid solution *4 | 10 | 10 | |
| Zinc oxide | | | 5 |
| Stearic acid | 1 | 1 | 1 |
| HAF carbon black | 36 | 36 | 36 |
| Process oil | 8 | 8 | 8 |
| Anti-aging agent *5 | 2 | 2 | |
| Anti-aging agent *6 | | | 2 |
| Vulcanization accelerator *7 | 0.5 | 0.5 | 1 |
| Vulcanization accelerator *8 | 2 | 2 | |
| Vulcanization accelerator *9 | | | 0.5 |
| Sulfur | | | 1 |

*1 Produced by Du-pont, chlorine content 35% by weight
*2 Produced by Du-pont, chlorine content 26% by weight
*3 Zetpole 2020, produced by Nippon Zeon Co., Ltd.
*4 KW-2100, produced by Kyowa Chemical Industry Co., Ltd.
*5 Nickeldibutyl-dithiocarbamate (NiDBC)
*6 Octylated-Diphenylamine
*7 Dibenzothiazyldisulfide (MBTS)
*8 Dipentamethylenethiuramtetrasulfide (DPTT)
*9 Tetramethylthiuramdisulfide (TMTD)

Sheets of rubber were doubled to produce first and second layers corresponding to the back surface (first) rubber layer and the tooth side (second) rubber layer. Using these sheets, the toothed belt 30, depicted in FIG. 2, was formed using a conventional press fit method. The belt produced was a ZA-tooth type with a tooth pitch of 9.525 mm, with 88 teeth and a width of 19.1 mm.

The belt was tested in an environment wherein it was subjected to lubrication and hot and cold temperatures, to determine the running time before cracking began

Lubrication Running Test

In this test, the belt was trained about a driving pulley, with 21 teeth, and a driven pulley, with 42 teeth. A tensioning pulley, having a 50 mm diameter, was placed against the belt between the drive and driven pulleys. The system was run at room temperature with the driving pulley rotating at 7200 rpm, with a load of 5 HP and an initial tension of 15 kgf. Engine oil was dripped at 100 cc/hr on the toothed part of the belt in contact with the driven pulley.

High Temperature Test

In this test, the tooth belt was trained about a driving pulley, with 21 teeth, and a driven pulley, with 42 teeth. A tensioning pulley with a 52 mm diameter was placed against the belt between the two pulleys. The system was run at an ambient temperature of 120° C. with the driving pulley rotating at a rate of 7200 rpm, with the belt under a load of 5 HP and an initial tension of 15 kgf.

Cold Temperature Test

In this test, the toothed belt was trained around a driving pulley with 24 teeth and a driven pulley with 24 teeth. The belt was left standing on the test setup for 15 hours, after which it was allowed to run at an ambient temperature of −35° C. The driving pulley was rotated at a rate of 1800 rpm under a load of 15 kgf for five minutes, after which it was kept standing for 25 minutes and then allowed to again run for an additional 5 minutes. The cycle was repeated. The results of the test are shown in Table 2.

TABLE 2

|  | Comparative Example | | | Example | |
| --- | --- | --- | --- | --- | --- |
|  | 1 | 2 | 3 | 1 | 2 |
| Back surface rubber layer (First layer) and its thickness (mm) | CSM-1 | CSM-2 | CSM-2 2.4 | CSM-2 1.4 | CSM-2 1.4 |
| Tooth side rubber layer (Second Layer) and its thickness (mm) | CSM-1 | CSM-2 | CSM-1 0.5 | CSM-1 1.4 | HNBR-1 1.4 |
| Volume of First Layer/Volume of Second Layer | — | — | 5/1 | 1/1 | 1/1 |
| Lubricating running | 350 hrs. Tooth root cracking | 60 hrs. Belt cut | 120 hrs. Tooth root cracking | 350 hrs. Tooth root cracking | 370 hrs. Tooth root cracking |
| Heating running | 1,100 hrs Back cracking | 2,800 hrs Back cracking | 2,700 hrs Back cracking | 2,600 hrs Back cracking | 2,700 hrs Back cracking |
| Cold Running | 32 hrs. Back cracking | 72 hrs. Back cracking | 68 hrs. Back cracking | 64 hrs. Back cracking | 68 hrs. Back cracking |

The results in Table 2 demonstrate the superiority of the inventive Examples 1 and 2 in terms of resistance to oil, heat and cold.

The foregoing disclosure of specific embodiments is intended to be illustrative of the broad concepts comprehended by the invention.

We claim:

1. A power transmission belt comprising:
   a belt body having an inside surface and an outside surface,
   said belt body having a compression section and a tension section spaced outside of said compression section,
   at least a first part of said tension section being defined by a chlorosulfonated polyethylene rubber composition having a chlorine content of 15 to 30% by weight, and
   at least a second part of said compression section being defined by a rubber composition that is different than the rubber composition of said first part.

2. The power transmission belt according to claim 1 wherein the rubber composition defining the second part is at least one of a) chlorosulfonated polyethylene rubber composition having a chlorine content of 32 to 45% by weight, b) a hydrogenated nitrile rubber composition, c) a nitrile rubber composition, and d) a chloroprene rubber composition.

3. The power transmission belt according to claim 2 wherein the chlorosulfonated polyethylene rubber composition in the second part has a chlorine content of 33 to 45% by weight.

4. The power transmission belt according to claim 2 wherein the chlorosulfonated polyethylene rubber composition in the second part has a chlorine content of 34 to 43% by weight.

5. The power transmission belt according to claim 2 wherein the belt body has a length and there are a plurality of load carrying cords extending lengthwise of the belt between the tension and compression sections.

6. The power transmission belt according to claim 5 wherein at least one of the load carrying cords comprises a plurality of twisted strands, each said strand comprising a plurality of alkali-free glass filaments of 8 to 10μ in diameter with a twist rate of 5 to 25 twists/10 cm to define a first strand assembly.

7. The power transmission belt according to claim 6 wherein the strands in the first strand assembly are twisted in a first direction and a plurality of said first strand assemblies are twisted in a direction opposite to the first direction at a rate of 3 to 13 twists/10 cm to define said one load carrying cord.

8. The power transmission belt according to claim 5 wherein the load carrying cords are treated with an RFL solution.

9. The power transmission belt according to claim 8 wherein the load carrying cords are subjected to an overcoat treatment.

10. The power transmission belt according to claim 8 wherein the RFL solution is a mixture of resorcinol-formalin initial condensation product and latex.

11. The power transmission belt according to claim 1 wherein the chlorosulfonated polyethylene rubber composition in the first part has a chlorine content of 15 to 28% by weight.

12. The power transmission belt according to claim 11 wherein the chlorosulfonated polyethylene rubber composition in the first part has a chlorine content of 20 to 27% by weight.

13. The power transmission belt according to claim 1 wherein the chlorosulfonated polyethylene rubber composition in the first part is one of a) chlorosulfonated low-density polyethylene having a linear molecular structure and b) a chlorosulfonated high-density polyethylene.

14. The power transmission belt according to claim 1 wherein the power transmission belt has a length and there are a plurality of teeth spaced lengthwise of the power transmission belt.

15. The power transmission belt according to claim 14 wherein there is a cover canvas layer on said teeth.

16. The power transmission belt according to claim 15 wherein the cover canvas is one of a) plain weave fabric, b) twill fabric, c) satin fabric, and d) fabric that is stretchable lengthwise of the belt.

17. The power transmission belt according to claim 15 wherein the canvas layer is made from a fabric defined by warp and weft threads and the threads are coated with one of a) a setting product that is one of i) an RFL solution, ii) an isocyanate solution, and iii) an epoxy solution, and b) rubber cement.

18. The power transmission belt according to claim 1 wherein the volume of the rubber composition of said first part is not more than 4 times the volume of the rubber composition of said second part.

19. The power transmission belt according to claim 1 wherein the first part has a uniform thickness.

20. The power transmission belt according to claim 1 wherein said first part has a thickness of at least 0.1 mm.

21. The power transmission belt according to claim 1 wherein the rubber composition of said first part extends contiguously from said tension section into said compression section.

22. The power transmission belt according to claim 1 wherein the rubber composition of said second part extends contiguously from said compression section into said tension section.

23. A power transmission belt comprising:
a belt body having an inside surface and an outside surface,
said belt body having a compression section and a tension section spaced outside of said compression section,
at least a first part of said tension section being defined by a chlorosulfonated polyethylene rubber composition having a chlorine content of 15 to 30% by weight, and
at least a second part of said compression section being defined by a rubber composition that is different than the rubber composition of said first part,
said rubber composition defining the second part being at least one of a) chlorosulfonated polyethylene rubber composition having a chlorine content of 15 to 30% by weight, b) a hydrogenated nitrile rubber composition, c) a nitrile rubber composition, and d) a chloroprene rubber composition, and
wherein a magnesium, oxide-aluminum oxide solid solution is added to the chlorosulfonated polyethylene in at least one of the first and second parts.

24. The power transmission belt according to claim 23 wherein the magnesium oxide-aluminum oxide solid solution is provided in 1 to 50 parts by weight per 100 parts by weight of chlorosulfonated polyethylene.

25. The power transmission belt according to claim 23 wherein the magnesium oxide-aluminum oxide solid solution is provided in 4 to 20 parts by weight per 100 parts by weight of chlorosulfonated polyethylene.

26. A power transmission belt comprising:
a belt body having an inside surface and an outside surface,
said belt body having a compression section and a tension section spaced outside of said compression section,
at least a first part of said tension section being defined by a first rubber composition,
at least a second part of said compression section being defined by a rubber composition that is different than the first rubber composition,
said rubber composition defining the second part being at least one of a) chlorosulfonated polyethylene rubber composition having a chlorine content of 32 to 45% by weight, b) a hydrogenated nitrile rubber composition, c) a nitrile rubber composition, and d) a chloroprene rubber composition.

27. The power transmission belt according to claim 26 wherein the belt body has a length and there are a plurality of teeth spaced lengthwise of the belt.

28. A power transmission belt comprising:
a belt body having a length, an inside surface, an outside surface, and a plurality of teeth on the inside surface and spaced lengthwise of the belt,
there being a canvas layer on the teeth, said belt having a compression section and a tension section spaced outside of said compression section, at least a first part of said tension section being defined by a chlorosulfonated polyethylene rubber composition having a chlorine content of 15 to 30% by weight, and at least a second part of said compression section being defined by a rubber composition that is at least one of a) a chlorosulfonated polyethylene rubber composition having a chlorine content of 32 to 45% by weight, b) a hydrogenated nitrile rubber composition, c) a nitrile rubber composition, and d) a chloroprene rubber composition.

29. The power transmission belt according to claim 28 wherein the magnesium oxide-aluminum oxide solid solution is provided in 1 to 50 parts by weight per 100 parts by weight of chlorosulfonated polyethylene.

30. The power transmission belt according to claim 28 wherein the volume of the rubber composition in said first part is not more than 4 times the volume of the rubber composition in said second part.

31. The power transmission belt according to claim 28 wherein the first part has a uniform thickness.

32. The power transmission belt according to claim 28 wherein said first part has a thickness of at least 0.1 mm.

33. The power transmission belt according to claim 28 wherein the rubber composition of said first part extends contiguously from said tension section into said compression section.

34. The power transmission belt according to claim 28 wherein the rubber composition of said second part extends contiguously from said compression section into said tension section.

35. The power transmission belt according to claim 28 wherein the chlorosulfonated polyethylene rubber composition in the first part is one of a) chlorosulfonated low-density polyethylene having a linear molecular structure and b) a chlorosulfonated high-density polyethylene.

36. The power transmission belt according to claim 28 wherein a magnesium oxide-aluminum oxide solid solution is added to the chlorosulfonated polyethylene in at least one of the first and second parts.

* * * * *